United States Patent [19]

Conche et al.

[11] Patent Number: 5,078,890
[45] Date of Patent: Jan. 7, 1992

[54] TECHNIQUE FOR THE REMOVAL OF PETROLEUM-BASED POLLUTANTS AND A MATERIAL FOR THAT PURPOSE

[75] Inventors: Michel Conche, Villers Saint Paul; Jean-Louis Fages, Boulogne, both of France

[73] Assignee: Isover Saint Gobain, Aubervilliers, France

[21] Appl. No.: 513,621

[22] Filed: Apr. 24, 1990

[30] Foreign Application Priority Data

Apr. 24, 1989 [FR] France ................ 89 05390

[51] Int. Cl.$^5$ ................ C02F 1/28
[52] U.S. Cl. ................ 210/691; 210/924; 210/922
[58] Field of Search ............ 210/691, 922, 923, 924, 210/925, 690; 501/36

[56] References Cited

U.S. PATENT DOCUMENTS

| | | | |
|---|---|---|---|
| 3,703,464 | 11/1972 | Ferm | 210/691 |
| 3,812,973 | 5/1974 | Stern | 210/924 |
| 3,855,152 | 12/1974 | Preus | 210/691 |
| 3,888,766 | 10/1975 | De Young | 210/680 |
| 4,006,079 | 2/1977 | Langlois | 210/608 |

FOREIGN PATENT DOCUMENTS

| | | |
|---|---|---|
| 0091381 | 4/1983 | European Pat. Off. |
| 2457345 | 12/1980 | France |
| 2553392 | 8/1983 | France |
| 2557817 | 1/1984 | France |
| 1235463 | 6/1971 | United Kingdom |

*Primary Examiner*—Stanley S. Silverman
*Assistant Examiner*—Neil McCarthy
*Attorney, Agent, or Firm*—Oblon, Spivak, McClelland, Maier & Neustadt

[57] ABSTRACT

Pollution removal is carried out using particles of felt made of hydrophobic mineral fibers, in which the felts used, which have been preliminarily compressed for storage and transport and after an unbinding operation, undergo pneumatic transport sufficiently forceful to allow them to regain their original density, said pneumatic transport being used simultaneously to spread the particles on the surface of the water to be treated.

5 Claims, No Drawings

TECHNIQUE FOR THE REMOVAL OF PETROLEUM-BASED POLLUTANTS AND A MATERIAL FOR THAT PURPOSE

BACKGROUND OF THE INVENTION

1. Field of the Invention

The invention concerns a technique for the removal of petroleum-based pollutants spilled on water, seas, lakes, rivers, etc, and a material designed for this usage.

2. Background of the Prior Art

Water pollution caused by spills of petroleum poses poorlyresolved problems, whether the pollution is widespread, as occurs as a result of shipwrecks, oil tankers, and "wild degasification" operations performed by these tankers, or pollution which is more localized, in particular on waterways.

Some conventional techniques make use of chemical agents which cause the dispersion or dissolution of the treated petroleum. In this case, the action taken is meant to minimize the damaging consequences of the oil, without, however, removing it.

Other methods call for attempts to remove the spilled oil. Various absorbent materials have been suggested for the conduct of operations of this kind. The material in question, which is spread at the surface of the polluted water, becomes loaded with oil. The absorbent material is retrieved and then destroyed, or at least stored at sites where it does not constitute too burdensome a problem To be used appropriately for the petroleum-absorption operation, the material selected must possess the following properties.

It must have good affinity for the oils normally encountered in this type of pollution and it must not be highly water-absorbent and thus not liable to become loaded with water, to the detriment, in particular of the oil-absorption capability sought.

Independently of these intrinsic properties which directly involve the capacity to separate oil and water, the product must, in addition, meet other requirements. Among these latter, it is essential that the material used be capable of easy retrieval, and consequently, that it float on the surface of the water. It must be possible, moreover, to keep the material under reduced volume and, if possible reduced weight, both to facilitate transport to the site where it will be used and to minimize storage costs. Finally, it is essential that the cost of the material be the lowest possible. This last requirement removes from consideration a large quantity of synthetic materials, including polyurethane foam, expanded polystyrene granules, or non-woven materials made of polypropylene or similar fibers.

The use of mineral wools has also been proposed. U.S. Pat. No. 4,006,079 thus describes the use of glass wool felts reinforced by a frame which provides cohesiveness. The felts are packaged in rolls, which are spread out over the surface of the oil slick to be absorbed. They are then taken up, still in the form of strips, after being impregnated with the petroleum. The use of this type of product is closely restricted by very specific requirements which do not lend themselves to ease of implementation. Furthermore, the use of a frame to reinforce the felt substantially complicates packaging and adds to the cost of the product.

The use of mineral wool for absorbing oil or petroleum products has, again, been proposed in British Patent 1,235,463 and in French Patent 2,457,345. These two documents describe the use of mineral wool in different forms, especially as granules of limited sizes.

While the advantage of felts made of mineral fibers for the absorption of petroleum products spilled on water is widely recognized, especially because of the relatively moderate costs of the products used, it is also known that this type of product possesses at least one disadvantage. Indeed, while the mass of the oil thus recovered in relation to the mass of the fibers used is relatively large, the volume of the fibers in relation to their weight is very high. In other words, a sizable volume of the product must be stored and transported.

To limit this problem, it is asserted that the felts used may be compressed. As regards normal felt, such as those described in these previous patents, it appears, however, that the compression rate remains limited. The compression rate of the mineral felts specified in the last two documents does not ordinarily exceed 4 or 5. One is, therefore, dealing with low-density products which, given their absorptive capacity, are relatively cumbersome.

SUMMARY OF THE INVENTION

The purpose of the invention is to provide a mineral woolbased material for the absorption of petroleum products having improved storage properties and which, furthermore, has an increased absorptive capacity, especially as regard the volume of the product in its least cumbersome packaging.

Another purpose of the invention is a method for use of the product according to the invention, which makes is possible to impart optimal properties to said product.

These goals are attained according to the invention by using mineral wools (glass or rock wool) under conditions resembling the techniques commonly terms "blown wool" in the field of thermal isolation. In accordance with these techniques, the mineral fibers, which are packaged in a highly-compressed form, make it possible to exceed 100 or 200 kg/m$^3$ for a precompression density of less than 30 kg/m$^3$ or event 15 kg/m$^3$ at the time of use, undergo an unbinding operation and a pneumatic conveyance process which is sufficiently forceful to allow them to regain a volume close to the initial one.

In the "blown wool" techniques used for insulation, the mineral wool, which is ordinarily glass wool ut may also be rock wool, is compressed from mass of low-density fibers in the form of piles in varying sizes. Mechanical means are used to detach these piles from the newly-manufactured felt strip. In the most widelyused form, these masses of fibers are detached using a carder-type device. The dimensions of these masses may vary considerably. For practical reasons, the felt is divided up into masses which are ordinarily limited to approximately 10 cm, and which do not exceed 20 cm. In use, these dimensions are sufficiently small that they do not work counter to the homogeneous packaging of the product, and, moreover, during the unpacking using pneumatic equipment which allows the fibers to spread, they allow the fibers to be divided up into tufts or flakes whose dimensions are substantially smaller. Virtually the same individual tufts or flakes brought together to form the original felt immediately after the production of the fibers from the molten glass material, reappear under the conditions of use being considered. In any event, using these techniques, it is found that the blown products, appropriately divided, are less than 5 cm in size, and, most often, less than 3 cm.

While the blown mineral wools conventionally used for insulation give good results when used according to the invention, use is preferably made, however, of felts which are pre-cut under the conditions described below. Prior to compression during storage, the fiber-based felts are cut into particles of less than 4 cm, and, preferably, of less than 3 cm. By pre-cutting to predetermined dimensions, the dimensions of the product to be ultimately spread in order to absorb the petroleum products are also fixed. The pre-cutting of the particles makes it possible to utilize fully the effects of the unpacking and pneumatic transport in order to give the fibers their original density. In other words, the pre-cutting of the felt particles makes it possible to obtain a more homogeneous product having, overall, a lower density. This pre-cutting also allows a better separation of the particle and, therefore, better contact with the petroleum products spilled on the water. In this form, a better "capture" of the dispersed petroleum products is obtained, as will be seem in the examples.

Beginning with the masses of material compressed for storage and transport, the separation and spreading method of the materials according to the invention includes, following a possible mechanical or even manual unbinding operation, the placement of the fiber masses in suspension in a gas current sufficiently strong to prevent these fibers from being deposited in the feeder lines which convey them to the spraying lance. This method also allows them to regain their original density.

To ensure this transport, during which the fibrous particles complete the separation process and regain essentially their initial volume, the gas current is propelled at a speed which is preferably not less than 15 m/s, and is preferably greater than 20 m/s.

The flow rate of the fibers in the gas current must not be too high, or else proper dispersion and proliferation of the particles cannot be obtained. Furthermore, for obvious reasons of yield, it is preferable to provide for a sufficient fiber flow rate. The aggregate of the gas in relation to the mass of the fibers is advantageously greater than 1.3, and, preferably, greater than 3. Even for products possessing lesser densities, a ratio of more than 10 would not procure any additional advantage.

The method used to place the fibers in suspension in the gas current may take various forms. Techniques and equipment for the implementation of this type of operation have been described in particular in French Patent Applications 2,553,392 and 2,557,817. These techniques are applicable within the sphere of application according to the invention.

The use of fibers to absorb petroleum products under the conditions just described gives the best results when these conditions are combined with a suitable choice of felts. In making this choice, not only the quality of the fibers themselves, but also the nature and especially the quantity of the binding agent used to attach the fibers together should be considered. The addition of products promoting a hydrophobic property and oil absorption constitutes, moreover, a factor which can improve still further the effectiveness of the products under consideration.

In the application of mineral fibers (glass or rock) to the absorption of petroleum products as previously described, the idea was advanced that absorptive capacity is linked to the fineness of the fibers. It does not appear, however, that the products proposed are among those composed of the finest fibers that can be produced.

French Patent Application 2,457,345, for example, proposes the use of felts composed of fibers of from 3 to 20 micrometers and possessing densities of from 40 to 120 kg/m$^3$ and, preferably, from 70 to 110 kg/m$^3$. Given these densities, it may be estimated that the average value of the diameter of the fibers exceeds 6 micrometers and that the fibers do not possess a very high degree of homogeneity. The choice of this type of felt, while not explained, is most plausibly linked to the concern for the maintenance of a certain mechanical resistance to violent pressure, and, consequently, to the retention of the absorbed products.

According to the invention, products are advantageously used whose fibers have smaller diameters. This greater fineness of the fibers does not, however, compromise mechanical resistance when the fibers are sufficiently uniform. This type of fiber, initially produced to make thermal insulation, has been previously produced to make thermal insulation, has been previously proposed in applications which make use of their water-absorbency (see French Patent Application 2,574,820), in particular for the manufacture of products for sanitary and hygienic uses. The use of fibers for the absorption of petroleum products spilled on water requires, on the contrary, a very high hydrophobic capacity. It is noteworthy that the same fiber structure may be adapted to these other properties without modifying their production method, by changing other properties, especially the binding agent.

The fibers advantageously used according to the invention have an average diameter such that their specific surface area is at least 0.25 m$^2$/g and, preferably, more than 0.5 m$^2$/g. Typically, these specific surface areas match fibers whose average diameter is less than 5 micrometers, and, potentially, less than 2.5 micrometers and extending down to less than 1 micrometer.

The best fibrous products do not contain "non-fibrous" filaments, i.e., particles whose dimensions are, for example, more than 20 micrometers. This is the case for fibers obtained using the centrifugation and gas stretching techniques used for the production of glass fibers, in which the glass is passed through a centrifuge, which then becomes a fiber-spinning apparatus.

As regards, methods of centrifugation on rollers used principally to produce rock wool, a certain proportion of "non-fibrous filaments" is inevitable. This does not mean that these felts cannot be used in accordance with the invention, but that the ratio between the mass of the petroleum product and the mass of the fibers is less satisfactory because of the increased mass due to the presence of these non-fibrous filament. This increase in mass in not, moreover, accompanied by any improvement in the retention of the petroleum products. The advantage of these rock wool products when considered against glass wool products lies in their production cost, which is appreciably lower for the same mass. At present, the cost differences are virtually compensated for by those relating to the densities of these products. Thus, the choice between them is made based on other criteria. In the rest of the description, reference is made principally to glass fiber felts.

The uniformity of the preferred fibrous products is such that more than 95% of the fibers have a diameter of between 0.5 and 2 times the average diameter.

Relatively long fibers are also preferred. Fibers prepared in conventional fashion using techniques set forth below, are several centimeters long, which, combined with a sufficiently isotropic distribution, is an important factor contributing to the restitution of thickness when unpackaged, especially since lowerdensity fibers are used at the outset.

The felts composed of the most advantageous fibers just described, have densities which may be very low. According to the invention, advantageous use is made of felts which, initially, have a density less than 50 kg/m$^3$ and, preferably, less than 30 kg/m$^3$, and may even fall to below 10 kg/m$^3$.

It will be seen that these felts undergo, during packaging, very significant compression, given the previously-indicated values of 200 kg/m$^3$ or more in this compressed state. The importance of fiber quality is understandable, when the restitution of thickness after compression is considered.

As regards, the thickness-restitution operation, fiber quality is complemented by the proportion of binding agent they incorporate. The "spring-like" effect of the fibers depends partly on the bonds linking the fibers as a result of the binding agent. To achieve this spring effect, a "meshwork" network of fibers must be created.

In conventional insulation applications, the binding agent is preferably composed of a water-repellant resin of the formophenolic type, which is added at the rate of from 2 to 6% fiber weight, this rate being generally decreased as the fibers become larger.

In accordance with the invention, the binding agent content plays a role both in the thickness-restitution mechanism and in the water-repellent property. Although the conventionally-used proportions used in the insulation products mentioned earlier can be used, strengthening the water-repellent property by using a slightly increased proportion of binding agent is generally preferred. Thus, in all cases the proportion of formo-phenolic resin is advantageous greater than 5% by weight of the fibers, and, for the finer products, this proportion can be raised to 15% ore more. Most frequently, the proportion of binding agent is between 8% and 12%.

In addition to the hydrophobic binding agent, or as a partial replacement for it, especially if limiting the proportion of binding agent is preferred, an agent having both a high fiber affinity and a marked hydrophobic nature is advantageously applied to the felt. A limited proportion of binding agent may be advantageous, especially for products having the greatest density. An excessive proportion of binding agent may product a certain degree of rigidity in the felts, and thus inhibit their capacity to spring back from high compression levels Appropriate hydrophobic agents include, for example, those named "silicones". The proportion of these agents applied to the felts is never very high. A proportion of approximately 0.5 to 3% is preferred; a higher proportion makes the product more expensive without improving its properties.

Among the silicones, preference is given to those which are emulsifiable in water, thereby making their use compatible with the conditions for the production of fiber-based felts. The silicone oils used also have the advantage of creating crosslinkages to a slight extent under the conditions of fixation belonging to binding agents.

To promote affinity for glass fibers, a silicone oil containing silanol groups is preferably chosen.

One advantage of these silicone oils lies in the fact that they may be added with the binding agent, and do not, therefore, require any additional operation during the manufacture of the felt.

DETAILED DESCRIPTION OF THE INVENTION

The invention is described more fully in the following text, in which reference is made to examples of implementation.

The felts used for the tests made in accordance with the invention are produced by following the methods described in European patent Application No. 0,091,381.

In this production mode, molten glass taken from a smelting furnace is poured into a centrifugation device.

The composition of the glass used matches, advantageously, that specified in the above-mentioned European Patent, i.e., in the following proportions by weight:

| $SiO_2$: | 61–66 | $Na_2O$: | 12.55–16.5 |
|---|---|---|---|
| $Al_2O_3$: | 2.5–5 | $K_2O$: | 0–3 |
| $CaO$: | 6–9 | $B_2O_3$: | 0–75 |
| $MgO$: | 0–5 | $Fe_2O_{23}$: | Less than 0.6 |

The molten glass is heated to a temperature of approximately 1500° C. in a continuous casting process in a feeding device mounted on the inside of the centrifuge which forms the fibers. The glass, divided into large jets (3 to 4 mm in diameter) is through against the inner peripheral wall of the centrifuge.

The centrifuge has a large number of openings through which the glass escapes under the effect of centrifugal force. These openings are small, i.e., approximately 1 mm in diameter.

The feed conditions, in particular the temperature and flow rate of the glass and the temperature of the centrifuge, are adjusted so as to maintain a continuous flow of the material from the centrifugation openings.

The fine filaments thrown from the openings in the wall of the centrifuge enter a high-speed current of hot gas which runs along the wall of the centrifuge in a line in proximity to the axis of the centrifuge.

The filaments are propelled and stretched by these hot gases which emanate, in conventional fashion, from an internal combustion burner.

The fibers thus formed congeal in contact with the ambient air and are deposited on a gas-permeable conveyor in the form of a lowdensity felt whose thickness is a function of the output of the fiber-forming device, of the width of the conveyor and of its running speed. The conditions may, as required, be adjusted so that the felt thus gathered can be used directly to form the layer of absorbent material according to the invention after it has been cut to suitable dimensions.

The composition of the binding agent is sprayed conventionally along the path taken by the fibers between the centrifuge and the receiving conveyor. This composition is finely sprayed to ensure the uniform coating of the fibers. The hydrophobic agent is added to the binding-agent composition In the following examples of products, the proportion of the silicone oil is set at 1% by weight of the felt. The proportion of the dry binding agent is 6%.

Two kinds of felt are produced using each technique.

The first type corresponds to the conventional production of blow wool insulation. The felt formed with a thickness of approximately 150 mm is placed in an oven to "fix" the binding agent. It is then divided into masses of about 150 mm in size. These masses are brought together and compressed in a plastic package. The initial density is, in both of the following cases, from 20 to 30 kg/m$_3$. In the packaging, the density is increased to 200 kg/m$_3$.

The second felt is produced with a thickness of approximately 3 cm and has a precompression density of approximately 20 kg/$_3$. After heating in an oven, the felt strip is cut into longitudinal strips 1.5 cm wide. These strips are guillotined in pieces measured 1.5×1.5 cm, which are then packaged as before at a density of 200 k/m$_3$.

The first tests are conducted in a laboratory on glass wool in piles having a density of 30 kg/m$_3$. In these tests, the maximum capacity for retention of the product is determined. The test is conducted as follows.

The contact cell between the hydrocarbon and the material is a cylindrical glass tube 10 cm in diameter and 10 cm high. At its lower opening, a net made of 6 mm tied mesh is attached to the lateral wall.

The tube and its netting are placed on a metal sieve having 1 mm openings at the bottom of a tank 30 cm in diameter and filled with water half-way up the height of the tube.

24 g of hydrocarbons are poured on the surface of the water inside the tube, thus making a layer of about 3 mm in thickness.

A known weight of absorbent, corresponding to a given ratio r oil/absorbent is spread over the hydrocarbon layer.

The entire system is then subjected to a horizontal back-and-forth movement for one hour at 50 cycles per minutes and with an amplitude of 3.5 cm.

The tube is removed from the water by raising the metal meshwork; the unit is then placed above a crystallizing apparatus. The tube is then slowly raised several centimeters above the sieve, and the absorbent is left to drip for 30 minutes through the netting.

The hydrocarbons which may have flowed through the net are extracted using a solvent; they are then analyzed by means of spectrocolorimetry.

By difference determination the weights of the hydrocarbons caught on the net are determined, thus giving the retention capacity Cr corresponding to the ratio of the weight of the retained hydrocarbons to the initial weight of the dry absorbent.

The test is repeated using increasing values r, until leakage of the dripping hydrocarbons is obtained.

The correspondent value when leakage appears equals the maximum retention capacity Cm.

The hydrocarbons used in these tests is of "Crude Arabian Light" cropped at 110° C. It has a density of 0.88 and a viscosity of 43 cPo Brookfield at 20° C.

The following table gives the various weights of the fibrous products used, the weights of the retained hydrocarbons, the ratio hydrocarbon weight/absorbent weight r, and the maximum retention capacity Cr.

TABLE 1

| Initial Weight of Hydrocarbon (Grams) | Initial Weight of Absorbent (Grams) | Weight Retained (Grams) | r | Cr |
| --- | --- | --- | --- | --- |
| 24.00 | 1.20 | 24.00 | 20.00 | 20.00 |
| 24.00 | 1.10 | 23.65 | 21.82 | 21.52 |

TABLE 1-continued

| Initial Weight of Hydrocarbon (Grams) | Initial Weight of Absorbent (Grams) | Weight Retained (Grams) | r | Cr |
| --- | --- | --- | --- | --- |
| 24.00 | 1.00 | 23.36 | 24.00 | 22.36 |
| 24.00 | 0.90 | 22.74 | 26.67 | 25.27 |
| 24.00 | 0.80 | 22.90 | 30.00 | 28.63 |
| 24.00 | 0.70 | 19.76 | 34.29 | 28.23 |

In the tests carried over, the maximum retention capacity is 28.6 g of hydrocarbons for 1 gram of fibrous products, and 97% of the apparent volume is saturated It must, furthermore, be pointed out that the products according to the invention are completely water-repellent. When subjected to the Boeing Material Specification 8-48 test, called the BMS test, for insulation, they exhibit a humidity retention of less than 2% by weight of the felt. The proportion of retained humidity after contact with water is, in fact, very much lower than 1% and may be considered negligible.

Tests as sea were conducted on products in masses and on cut products.

A 200-liter layer of light fuel oil is spread on the sea. The light fuel oil has a viscosity of 50 cSt at 20°.

The spraying of the products is carried out using a blowing machine producing an output of fibers at the rate of 1 kg/m$_3$ of air and generating a spraying speed of 30 m/s. The fibrous products, which have been preliminarily unbound in pieces of approximately 170 mm, proliferate well. The apparent density if approximately 20 kg/m$_3$.

The tufts sprayed separate relatively well. They are approximately 50 mm or less.

The recovery of the saturated product is carried out using a trawl attached to the end of a lifting arm. The trawl is composed of a large funnel equipped with interchangeable pickets. These pockets have, in conventional fashion, lozenge-shaped meshes measuring 5 mm on a side. The floating particles are easily captured. It should be pointed out in this regard to their clear yellow color makes them relatively easy to spot.

The saturation rate, although lower than in the laboratory, remains highly satisfactory (approximately 20 g of fuel oil per gram of fiber).

The same test, carried out on pre-cut felt particles, shows a significant improvement in retention, which increases to approximately 40 and 50 grams of fuel oil per gram of fiber.

What is claimed is:

1. A process for the removal of petroleum products pollution on a portion of a surface of a body of water, comprising:
    (A) pneumatically spraying particles of felt comprised of mineral fibers of specific surface area at least 0.25 m$_2$/g on said surface portion, said particles not exceeding 4 cm in any dimension,
    (B) allowing said particles of felt to absorb said petroleum product pollution, and
    (C) recovering said particles of felt, wherein said particles of felt, prior to said pneumatic spraying, are compressed, from an original density in a range of from about 10 to 50 kg/m$^3$ to a substantially higher density such that during said pneumatic spraying said particles of felt recover said original density.

2. The process of claim 1, wherein said felts, prior to said compression, are separated into masses whose dimensions do not exceed 20 cm, said masses, during said pneumatic spraying, being separated into tufts whose dimensions do not exceed 5 cm.

3. The process of claim 1, wherein the felt, prior to compression, is cut into particles not exceeding 4 cm in any dimension.

4. The process of claim 1, wherein said pneumatic transport comprises spraying said particles in a gas current at a speed exceeding 15 m/s.

5. The process of claim 1, wherein said pneumatic transport comprises spraying said particles in a transport gas, the ratio of the mass of said gas to the mass of fibers transported thereby being at least 1.3.

* * * * *